(12) United States Patent
Hsia (10) Patent No.: US 9,844,123 B2
(45) Date of Patent: Dec. 12, 2017

(54) SOLID-STATE LIGHTING OPERABLE WITH BALLASTS AND LINE VOLTAGES WITHOUT AMBIGUITY

(71) Applicant: Lightel Technologies, Inc., Renton, WA (US)

(72) Inventor: Chungho Hsia, Bellevue, WA (US)

(73) Assignee: LIGHTEL TECHNOLOGIES, INC., Renton, WA (US)

( * ) Notice: Subject to any disclaimer, the term of this patent is extended or adjusted under 35 U.S.C. 154(b) by 0 days.

(21) Appl. No.: 15/599,452

(22) Filed: May 18, 2017

(65) Prior Publication Data

US 2017/0257928 A1     Sep. 7, 2017

Related U.S. Application Data (63) Continuation-in-part of application No. 15/199,365, filed on Jun. 30, 2016, now Pat. No. 9,668,308, which is a continuation-in-part of application No. 15/050,363, filed on Feb. 22, 2016, now Pat. No. 9,544,959, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, (Continued)

(51) Int. Cl.
| | |
|---|---|
| *H05B 37/02* | (2006.01) |
| *H02M 7/02* | (2006.01) |
| *H02M 1/42* | (2007.01) |
| *G05F 1/10* | (2006.01) |
| *G05F 1/70* | (2006.01) |

(52) U.S. Cl.
CPC ............ *H05B 37/029* (2013.01); *G05F 1/10* (2013.01); *G05F 1/70* (2013.01); *H02M 1/4233* (2013.01); *H02M 1/4266* (2013.01); *H02M 7/02* (2013.01)

(58) Field of Classification Search
None
See application file for complete search history.

(56) References Cited

U.S. PATENT DOCUMENTS

| | | | | |
|---|---|---|---|---|
| 5,793,640 A | * | 8/1998 | Wu | ............... G01R 27/2605 324/600 |
| 2014/0265900 A1 | * | 9/2014 | Sadwick | ............ H05B 33/0803 315/200 R |

(Continued)

*Primary Examiner* — Douglas W Owens
*Assistant Examiner* — James H Cho
(74) *Attorney, Agent, or Firm* — Han IP Corporation; Andy M. Han (57) ABSTRACT

A light-emitting diode (LED) lamp using an LED driving circuit, at least two frequency sensitive devices, at least six diodes configured to convert an AC voltage into a DC voltage and manage electric current flows, a switch control module, and a return current switch operates normally with an input voltage from either ballast or line voltages of AC mains. The LED driving circuit may be configured to operate normally only with the AC mains providing a regulated power and a current to LED arrays. When an input AC voltage is applied to the LED lamp, the at least six diodes and the at least two frequency sensitive devices can detect the input AC voltage, control electric current flowing into the switch control module or the LED driving circuit, and complete current returns so that the LED lamp can operate with either the ballast or the AC mains without operational ambiguity.

14 Claims, 5 Drawing Sheets

Related U.S. Application Data which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

(56) References Cited

U.S. PATENT DOCUMENTS

| | | | |
|---|---|---|---|
| 2014/0268779 A1* | 9/2014 | Sorensen | F21K 9/232 362/249.06 |
| 2016/0073454 A1* | 3/2016 | Powell | H05B 33/0809 315/201 |
| 2016/0109070 A1* | 4/2016 | Davenport | F21V 25/00 362/221 |
| 2016/0309550 A1* | 10/2016 | Xiong | H05B 33/0809 |

* cited by examiner

SOLID-STATE LIGHTING OPERABLE WITH BALLASTS AND LINE VOLTAGES WITHOUT AMBIGUITY

CROSS-REFERENCE TO RELATED APPLICATIONS

The present disclosure is part of a continuation-in-part (CIP) application of U.S. patent application Ser. No. 15/199,365, filed 30 Jun. 2016 and currently pending, which is a CIP application of U.S. patent application Ser. No. 15/050,363, filed 22 Feb. 2016 and issued as U.S. Pat. No. 9,544,959 on 10 Jan. 2017, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. The above-identified applications are incorporated herein by reference in their entirety.

BACKGROUND

Technical Field

The present disclosure relates to light-emitting diode (LED) lamps that work with conventional fluorescent lamp fixtures configured to electrically connect either ballasts or line voltages.

Description of the Related Art

Solid-state lighting from semiconductor light-emitting diodes (LEDs) has received much attention in general lighting applications today. Because of its potential for more energy savings, better environmental protection (with no hazardous materials used), higher efficiency, smaller size, and longer lifetime than conventional incandescent bulbs and fluorescent tubes, the LED-based solid-state lighting will be a mainstream for general lighting in the near future. Meanwhile, as LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit applications of an LED lamp to replace an existing fluorescent lamp, consumers may choose either to adopt a ballast-compatible LED lamp with an existing ballast used to operate the fluorescent lamp or to employ an AC mains-operable LED lamp by removing/bypassing the ballast. Either application has its advantages and disadvantages. In the former case, although the ballast consumes extra power, it is straightforward to replace the fluorescent lamp without rewiring, which consumers have a first impression that it is the best alternative. But the fact is that total cost of ownership for this approach is high regardless of very low initial cost. For example, the ballast-compatible LED lamps work only with particular types of ballasts. If the existing ballast is not compatible with the ballast-compatible LED lamp, the consumer will have to replace the ballast. Some facilities built long time ago incorporate different types of fixtures, which requires extensive labor for both identifying ballasts and replacing incompatible ones. Moreover, a ballast-compatible LED lamp can operate longer than the ballast. When an old ballast fails, a new ballast will be needed to replace in order to keep the ballast-compatible LED lamps working. Maintenance will be complicated, sometimes for the lamps and sometimes for the ballasts. The incurred cost will preponderate over the initial cost savings by changeover to the ballast-compatible LED lamps for hundreds of fixtures throughout a facility. In addition, replacing a failed ballast requires a certified electrician. The labor costs and long-term maintenance costs will be unacceptable to end users. From energy saving point of view, a ballast constantly draws power, even when the ballast-compatible LED lamps are dead or not installed. In this sense, any energy saved while using the ballast-compatible LED lamps becomes meaningless with the constant energy use by the ballast. In the long run, the ballast-compatible LED lamps are more expensive and less efficient than self-sustaining AC mains-operable LED lamps.

On the contrary, an AC mains-operable LED lamp does not require a ballast to operate. Before use of the AC mains-operable LED lamp, the ballast in a fixture must be removed or bypassed. Removing or bypassing the ballast does not require an electrician and can be replaced by end users. Each AC mains-operable LED lamp is self-sustaining. Once installed, the AC mains-operable LED lamps will only need to be replaced after 50,000 hours. In view of above advantages and disadvantages of both the ballast-compatible LED lamps and the AC mains-operable LED lamps, it seems that market needs a most cost-effective solution by using a universal LED lamp that can be used with the AC mains and is compatible with a ballast so that LED lamp users can save an initial cost by changeover to such an LED lamp followed by retrofitting the lamp fixture to be used with the AC mains when the ballast dies.

Ballasts have several different types. However, in the US, electronic ballasts are most popular in lamp fixtures because they are more efficient and less expensive than other types of ballasts. Nevertheless, it is better for the ballast-compatible LED lamp to be compatible with either electronic ballasts or other types of ballasts.

As mentioned above, a cost-effective solution may be to use a ballast as part of an LED driver to operate a lamp. In some prior art schemes, a switching mode power supply (SMPS) type LED driver is proposed to use with a ballast, but has not been completely accepted due to occasional fires that arise inside the ballast. The cause of these fires has been identified to be a large dc input capacitor in the SMPS type LED driver, which may destroy a capacitor in the ballast due to excessive initial resonant voltage. A conventional SMPS type LED driver for AC mains comprises a Buck converter, which can efficiently convert input voltages of 110~277 VAC into a DC voltage required to power LEDs in an LED lamp. However, the ballast has an output voltage much higher than 277 VAC with a frequency well above 60 Hz. Such a Buck converter is controlled by a control logic, which has several drawbacks that limit its use in ballast applications. First, the control logic has a low operating voltage range which inherently limits the wide range of input voltages that can be used. Second, an over-voltage protection (OVP) function in the control logic starts at a low voltage limited by the low operating voltage. When an input voltage from a ballast exceeds a certain value, OVP functions to stop operation, shutting down the lamp. Third, the Buck converter operates in a continuous conduction mode, in which an input current fails to follow the input voltage, leading to a low power factor with the AC mains and turn-on or other operational failures with the ballast. Fourth, the control logic is solely powered by a voltage built up by an input capacitor with a small capacitance to meet a short start-up requirement. When the input voltage drops to the minimum operating voltage level, the control logic fails to operate and sends no signals to the switch, and the Buck converter stops to function until the input voltage level recovers, resulting in flickering. For an LED lamp operating solely with a ballast, the power and current control is basically via an impedance or output voltage control. In the former case, when input frequency changes, the impedance changes, altering an AC current to flow into the driving circuit. A ballast is, in practice, supposed to operate two or more lamps, and its output frequency of the ballast decreases as a load increases, meaning that the total power consumption does not linearly increase as the number of lamps used increases. In the worst case, an LED lamp that is designed for a group of three or four lamps in a fixture powered by a ballast may be burned out due to over-rated current flowing into the LED arrays in the lamp if only one of such a lamp is installed and operated for a long time in the fixture. For the latter case, the output voltage control approach may work with an electronic ballast but cannot be used in AC mains. In general, conventional LED drivers fail to work with a ballast and to properly operate an LED lamp at a regulated power, resulting in unstable lighting output. It goes without saying that the same LED drivers can flawlessly operate the LED lamp with the AC mains.

In U.S. Pat. No. 9,288,867, a ballast compatible and AC mains operable LED driver is disclosed to operate an LED lamp with either a ballast or a line voltage. However, the driver used needs to operate in a wide range of input voltage and frequency by using a power factor correction (PFC) and control device specially designed for such an application. When such a PFC and control device is not available, a dual mode operation seems impossible to achieve. In the present disclosure, a novel approach using a general-purpose PFC and control device to achieve functionality with either ballasts or line voltages in LED lamps will be well addressed.

SUMMARY

The present disclosure aims to provide a novel approach for an LED lamp to operate with either line voltages from AC mains or a ballast. The LED lamp may include a housing having one end or two opposite ends; one or more LED arrays; one or two lamp bases respectively connected to the one end or two opposite ends of the housing; at least two frequency sensitive devices; at least six diodes configured to manage electric current flows and to convert an alternating current (AC) input voltage from the line voltages of the AC mains or from the ballast into a direct current (DC) voltage; a switch control module; a return current control switch; and an LED driving circuit. The LED lamp is used to replace a fluorescent lamp in a retrofit or newly-made lamp fixture that could have an existing ballast installed or simply an AC mains-ready configuration. When such an LED lamp is installed in the fixture, the at least six diodes and the at least two frequency sensitive devices can detect if the input AC voltage from the ballast or line voltages from AC mains is applied, control electric current flows, and complete current returns so that the LED lamp can operate with either the existing ballast or the line voltages from AC mains without operational ambiguity.

The at least two frequency sensitive devices, the at least six diodes, the switch control module, and the return current control switch connected with the switch control module incorporating with the LED driving circuit are essential to make such a dual-mode operation possible. The LED driving circuit may include an input filter, a power factor correction (PFC) and control device, a Buck converter in communicating with the PFC and control device, and an output capacitor in parallel with a resistor connected to the Buck converter to build up an output voltage and to power the one or more LED arrays. The Buck converter comprises a first switch controlled by the PFC and control device, a current sensing resistor, a diode, and an inductor with its current charging and discharging controlled by the first switch. The PFC and control device detects zero current in the inductor generating control signals to control the first switch on and off with a constant on-time and a varied off-time. By adapting switching frequencies, the LED driving circuit can provide an accurate output LED current required to operate the one or more LED arrays when the input AC voltage is from a regular 110, 277, or 347 VAC line voltages of the AC mains. That is, when the input AC voltage is from the AC mains, the at least two frequency sensitive devices and the at least six diodes manage to drastically reduce a current flowing into the switch control module. Whereas the input DC voltage to the LED driving circuit is normal, the LED driving circuit is enabled to operate and provide a proper current required to the one or more LED arrays. On the other hand, when the input AC voltage is from the ballast, the at least two frequency sensitive devices and the at least six diodes manage a current flowing into the switch control module. Because supply current from the ballast is limited, the inrush current flowing into the switch control module crashes the input DC voltage to a substantially low level, which is not sufficiently high enough to operate the LED driving circuit. Instead, the return current control switch connected with the switch control module is enabled by the switch control module to conduct a current from the one or more LED arrays back to an applicable electrical connection terminal, thus completing the power transfer to the one or more LED arrays for using ballast as a power source.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF VARIOUS EMBODIMENTS

Figure 1:
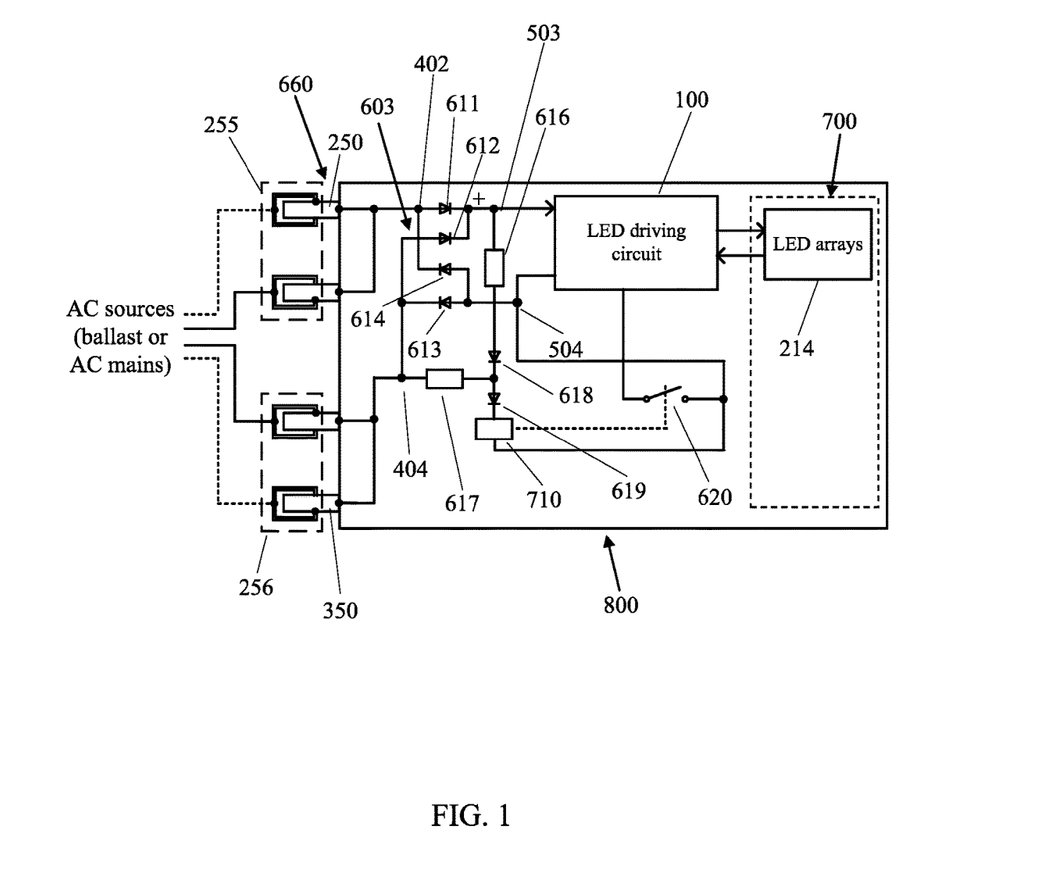
FIG. 1 is a block diagram of an LED lamp operable with either line voltages from AC mains or a ballast according to the present disclosure.

FIG. 1 is a block diagram of an LED lamp 800 operable with either line voltages from AC mains or a ballast according to the present disclosure. The LED lamp 800 comprises a light emission portion 700; a lamp base 660 comprising two electrical connection terminals 255 and 256 each respectively with two bi-pins 250 and 350 protruding outwards; at least six diodes comprising at least one rectifier 603 comprising at least four diodes 611, 612, 613, and 614 interconnected at four input/output ports 402, 404, 503, and 504 and at least two current control diodes 618 and 619; an LED driving circuit 100 having two inputs connected to the input/outputs 503 and 504 receiving a direct current (DC) voltage rectified from the at least one rectifier 603; and one or more LED arrays 214 disposed in the light emission portion 700. The two pins of the respective bi-pins 250 and 350 are interconnected before connecting to the at least one rectifier 603 via the input/output ports 402 and 404. The LED lamp 800 further comprises at least two frequency sensitive devices 616 and 617 together with the at least two current control diodes 618 and 619 configured to manage electric current flows; a switch control module 710; and a return current control switch 620 controlled by the switch control module 710. The LED lamp 800 is used to replace a fluorescent lamp in a retrofit or newly-made lamp fixture that could have an existing ballast installed or simply an AC mains-ready configuration. When the LED lamp 800 is installed in the fixture sockets electrically connected with either the ballast or the AC mains, the at least two frequency sensitive devices 616 and 617 and the at least two current control diodes 618 and 619 detect if an input AC voltage is from the ballast or the line voltages from the AC mains.

If the input AC voltage is from line voltages, such as 110, 277, or 347 V, of the AC mains, the at least two frequency sensitive devices 616 and 617 and the at least two current control diodes 618 and 619 substantially reduce a current to flow into the switch control module 710, thus disabling the switch control module 710 and the return current control switch 620. Instead, a normal DC voltage appears between the input/output ports 503 and 504, enabling the LED driving circuit 100 to operate normally. The electric current flows into the LED driving circuit 100, continuing to flow into the one or more LED arrays 214. The current returned from the one or more LED arrays 214 goes through the LED driving circuit 100, further down to the input/output port 504, completing the power transfer to the one or more LED arrays 214 for the line voltages as a power source.

If the input AC voltage from the ballast is detected, the at least two frequency sensitive devices 616 and 617 and the at least two current control diodes 618 and 619 promote a current to flow into the switch control module 710, thus enabling the switch control module 710. Because a supply current from the ballast is limited, the inrush current flowing into the switch control module 710 crashes the input DC voltage between the input/output ports 503 and 504 to a substantially low level, which is not sufficiently high enough to operate the LED driving circuit 100, thus disabling the LED driving circuit 100. Instead, when the switch control module 710 is enabled, the return current control switch 620 is turned on by the switch control module 710, which conduct a current returned from the one or more LED arrays 214 back to an applicable electrical connection terminal, thus completing the power transfer to the one or more LED arrays 214 for the ballast as a power source.

In general, the LED lamp 800 depicted in FIG. 1 may fit in different sockets and thus may have different base types and shapes. In FIG. 1, although the LED lamp 800 is shown to have two sets of the electrical connection terminals 255 and 256 each with respective bi-pins 250 and 350, the LED lamp 800 may have only one pin on each of the two electrical connection terminals 255 and 256. The dotted line connected between AC sources and the two sets of the electrical connection terminals 255 and 256 denotes such a possibility. Nevertheless, the LED lamp 800 may come in a wide variety of shapes and rest on various electrical connection terminals with base types fixed with two or four pins used in compact fluorescent lamps (CFLs) and compact fluorescent bulbs, or with other E-base types used in other fluorescent lamps. Base types for two pin plug-in CFLs comprise G23, GX23, and G24D. For 4 pin plug-in CFLs, base types comprise G24Q, GX24Q, and 2G11. Base types for compact fluorescent bulbs comprise two-pin GU24, GU10 and GU5.3. The E-base types, although not of a pin-type, comprise E26, E27, or E39. As mentioned above, because the two pins of the respective bi-pins 250 and 350 in the LED lamp 800 are interconnected before connecting to the at least one rectifier 603 via the input/output ports 402 and 404, either two-pin or four-pin operation works with the LED lamp 800.

Figure 2:
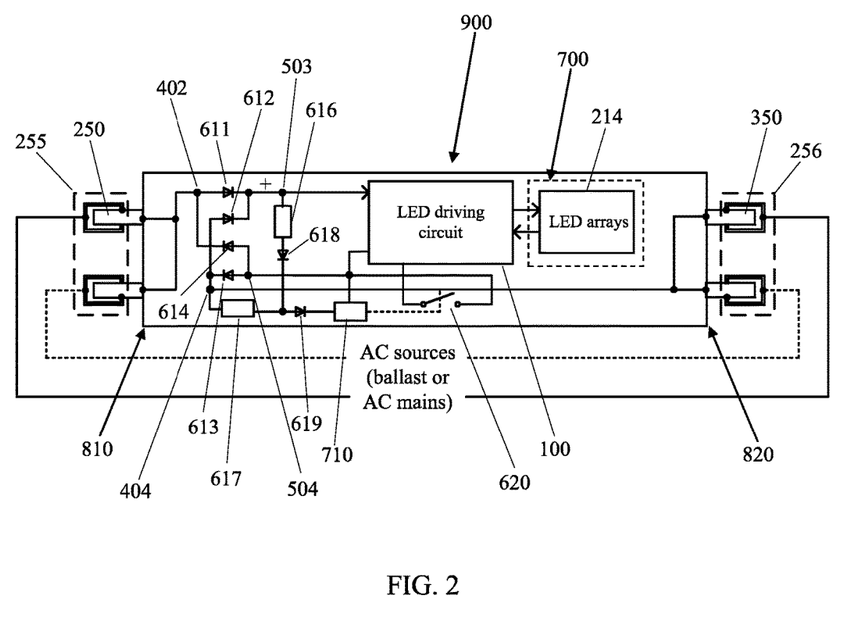
FIG. 2 is a block diagram of a linear LED tube lamp operable with either line voltages from AC mains or a ballast according to the present disclosure.

FIG. 2 is a block diagram of a linear LED tube lamp 900 operable with either line voltages from AC mains or a ballast according to the present disclosure. The linear LED tube lamp 900 in FIG. 2 has all the component as the LED lamp 800 in FIG. 1 does except that the two bi-pins 250 and 350 protruding outwards from the two ends of the linear LED tube lamp 900 with the two electrical connection terminals 255 and 256. In FIG. 2, the same numerals are used for the same components as in FIG. 1. The linear LED tube lamp 900 comprises a housing having two opposite ends; two lamp bases 810 and 820 having respective bi-pins 250 and 350 at each end of the housing; at least six diodes comprising at least one rectifier 603 comprising at least four diodes 611, 612, 613, and 614 interconnected at four input/output ports 402, 404, 503, and 504 and at least two current control diodes 618 and 619; an LED driving circuit 100 having two inputs connected to input/outputs 503 and 504; and one or more LED arrays 214 disposed in a light emission portion 700. The two pins of the respective bi-pins 250 and 350 are interconnected before connecting to the at least one rectifier 603 via the input/output ports 402 and 404. The linear LED tube lamp 900 further comprises at least two frequency sensitive devices 616 and 617 together with at least two current control diodes 618 and 619 configured to manage electric current flows; a switch control module 710; and a return current control switch 620 controlled by the switch control module 710. The linear LED tube lamp 900 is used to replace a linear fluorescent lamp such as T5, T8, or T12 lamps in a retrofit or newly-made lamp fixture that could have an existing ballast installed or simply an AC mains-ready configuration. When the linear LED tube lamp 900 is installed in the fixture, the at least two frequency sensitive devices 616 and 617 and the at least two current control diodes 618 and 619 detect if an input AC voltage is from a ballast or line voltages from AC mains.

If the input AC voltage is from the AC mains, the at least two frequency sensitive devices 616 and 617 and the at least two current control diodes 618 and 619 substantially reduce a current to flow into the switch control module 710, thus disabling the switch control module 710 and the return current control switch 620. Instead, a normal DC voltage appears between the input/output ports 503 and 504, thus enabling the LED driving circuit 100 to operate normally. The electric current flows into the LED driving circuit 100, continuing to flow into the one or more LED arrays 214. The current returned from the one or more LED arrays 214 goes through the LED driving circuit 100, further down to the input/output port 504, completing the power transfer to the one or more LED arrays 214.

If the input AC voltage from either T5, T8, or T12 fluorescent tube ballast is detected, the at least two frequency sensitive devices 616 and 617 and the at least two current control diodes 618 and 619 promote a current to flow into the switch control module 710, thus enabling the switch control module 710. Because supply current from the ballast is limited, the inrush current flowing into the switch control module 710 crashes the input DC voltage between the input/output ports 503 and 504 to a substantially low level, which is not sufficiently high enough to operate the LED driving circuit 100, thus disabling the LED driving circuit 100. Instead, when the switch control module 710 is enabled, the return current control switch 620 is turned on by the switch control module 710, which conduct a current returned from the one or more LED arrays 214 back to an applicable electrical connection terminal, thus completing the power transfer to the one or more LED arrays 214.

In general, the linear LED tube lamp 900 depicted in FIG. 2 may fit in different sockets such as ones used in either T5, T8, or T12 fluorescent tubes. In FIG. 2, although the linear LED tube lamp 900 is shown to have the two electrical connection terminals 255 and 256 each with respective bi-pins 250 and 350 to receive power from AC sources, the linear LED tube lamp 900 may receive power from only one of two pins of each of two bi-pins 250 and 350. The dotted line connected between AC sources and the two electrical connection terminals 255 and 256 in FIG. 2 denotes such a possibility. Nevertheless, the linear LED tube lamp 900 may come in different lamp bases such as G13 and G5. As mentioned above, because the two pins of the respective bi-pins 250 and 350 in the linear LED tube lamp 900 are interconnected before connecting to the at least one rectifier 603 via the input/output ports 402 and 404, either two-pin or four-pin operation works with the linear LED tube lamp 900. Although the linear LED tube lamp 900 depicted in FIG. 2 has a double-ended configuration, a single-ended operation is possible as long as the input AC voltage is applied between the input/output ports 402 and 404. In FIGS. 1 and 2, although only one rectifier 603 is shown, each of the LED lamp 800 or the linear LED tube lamp 900 may comprise two rectifiers, featuring any-two input connection operable as long as a higher electrical potential port (i.e. the input/output port 503) and a lower electrical potential port (i.e. the input/output port 504) of each rectifier are respectively connected each other.

Figure 3:
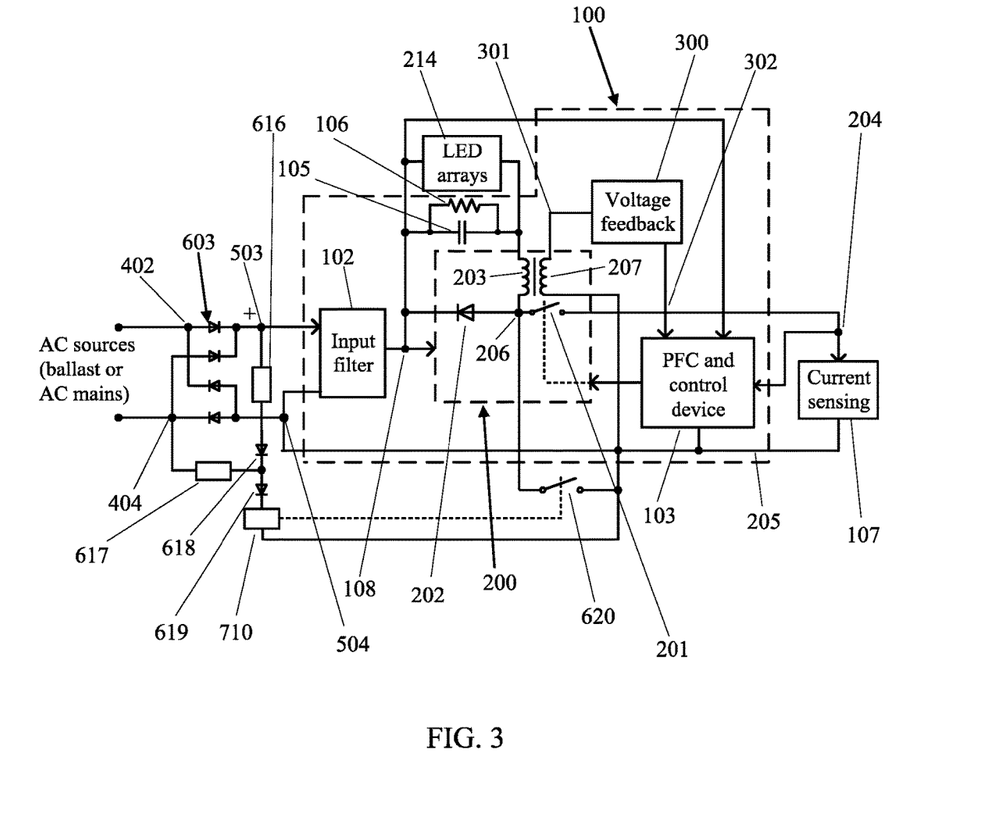
FIG. 3 is a block diagram of an LED driving circuit used in an LED lamp operable with either line voltages from AC mains and a ballast according to the present disclosure.

FIG. 3 is a block diagram of an LED driving circuit 100 used in an LED lamp operable with either line voltages from AC mains or a ballast according to the present disclosure. In FIG. 3, the same numerals are used for the same components as in FIGS. 1 and 2. The LED driving circuit 100 connects to input/output ports 503 and 504 interconnected with at least one rectifier 603 with either line voltages from the AC mains or a ballast applied to ports 402 and 404. When an input AC voltage applies between the ports 402 and 404, the at least one rectifier 603 converts an alternating current (AC) input voltage into a direct current (DC) voltage between the input/output ports 503 and 504. The LED driving circuit 100 comprises an input filter 102 used to filter an input voltage from the input/output ports 503 and 504 and to suppress EMI noise created in the LED driving circuit 100, a power factor correction (PFC) and control device 103, a Buck converter 200 in communicating with the PFC and control device 103, an output capacitor 105 in parallel with a resistor 106 connected to the Buck converter 200 to build up an output voltage and to power the one or more LED arrays 214, and a current sensing resistor 107. A high electric potential at the input/output port 503 and a low electric potential at the input/output port 504 respectively connect to the high side and the low side of the input filter 102 with the low electric potential input/output port 504 as a common ground. The Buck converter 200 comprises a first switch 201 controlled by the PFC and control device 103, a diode 202, and an inductor 203 with its current charging and discharging controlled by the first switch 201. The PFC and control device 103 detects zero current in the inductor 203 and generate control signals to control the first switch 201 on and off with a constant on-time and a varied off-time. By adapting switching frequencies, the PFC and control device 103 controls the first switch 201 on and off in a way that the inductor 203 is charged during on-time and discharged during off-time until a desired output voltage $V_o$ across the one or more LED arrays 214 is reached to light up the one or more LED arrays 214. An average inductor current is thus equal to the output current that flows into the LED array 214. When the first switch 201 is on, the diode 202 is reverse-biased, and an input current flows from an output port 108 in the input filter 102, the output resistor 106, the inductor 203, the first switch 201, the first port 204 of the current sensing resistor 107, the current sensing resistor 107 itself, and the second port 205 of the current sensing resistor 107, back to the low electric potential port 504. When the current flowing into the inductor 203 increases, the voltage across the current sensing resistor 107 increases. The PFC and control device 103 connecting to the first and the second ports 204 and 205 of the current sensing resistor 107 continuously receives signals and adjusts the off-time such that the output voltage and current to the one or more LED arrays 214 are regulated to meet the output requirements. The output capacitor 105 in parallel with the resistor 106 connecting to the inductor 203 thus can receive energy to build up an output voltage and to power the one or more LED arrays 214.

In FIG. 3, the inductor 203 is configured as a primary winding of a transformer. When the power is on, an input current enters the input filter 102 and then the PFC and control device 103, turning on the first switch 201. Whereas the diode 202 is reverse-biased, the input current goes from the resistor 106, the inductor 203, the first switch 201, and the current sensing resistor 107 to the common ground 504. When the input current goes into the inductor 203, energy is stored in it. The PFC and control device 103 detects the input voltage level and controls the first switch 201 on and off in a way that a desired output voltage $V_o$ across the one or more LED arrays 214 is reached to light up the one or more LED arrays 214. When the first switch 201 is off, the diode 202 is forward-biased, and the inductor 203 releases the energy stored, resulting in a loop current flowing from the diode 202 and the one or more LED arrays 214, back to the inductor 203, completing the energy transfer to the one or more LED arrays 214. When the first switch 201 is on, the input current flows into the one or more LED arrays 214, the inductor 203, the first switch 201, and the current sensing resistor 107, creating a voltage drop across the current sensing resistor 107. The voltage appearing at the port 204 of the current sensing resistor 107 inputs to the PFC and control device 103 to control the off-time of the switch 201. The closed loop operation in both on-time and off-time of the switch 201 ensures the output current to be accurately controlled within 4%.

The LED driving circuit 100 may further comprise a voltage feedback module 300. The voltage feedback module 300 has two connection ports 301 and 302, with the first connection port 301 connecting to a high side of a secondary winding 207 in the transformer and with the second connection port 302 connecting to the PFC and control device 103, as shown in FIG. 3. The voltage feedback module 300 continuously monitors the output voltage by using the secondary winding 207 in the transformer. When the voltage at the high side of the secondary winding 207 in the transformer is higher than a becoming lower operating voltage in the PFC and control device 103 due to increased internal operations, the diode (not shown) in the voltage feedback module 300 conducts to supply energy in time through the second connection port 302 and to sustain the operating voltage in the PFC and control device 103. That is, the voltage feedback module 300 extracts partial energy from the output voltage to sustain the PFC and control device 103. Although the function of the voltage feedback module 300 is essential for flicker-free operation of the LED lamps, a different LED driving circuit design may eliminate its use.

Figure 4:
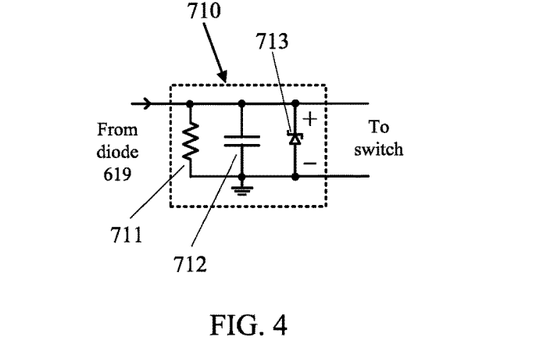
FIG. 4 is an embodiment of a switch control module used in an LED lamp operable with either line voltages from AC mains or a ballast according to the present disclosure.

FIG. 4 is an embodiment of a switch control module used in an LED lamp operable with either line voltages from AC mains or a ballast according to the present disclosure. Referring to FIGS. 3 and 4, the LED driving circuit 100 is further interconnected with at least two frequency sensitive devices 616 and 617; at least two current control diodes 618 and 619 configured to manage electric current flows; a switch control module 710 comprising a resistor 711, a capacitor 712, and a Zener diode 713 (in FIG. 4) connected in parallel; and a return current control switch 620 controlled by the switch control module 710. The return current control switch 620 is connected with the first switch 201 at a port 206 in the LED driving circuit 100. When the input AC voltage is applied between the ports 402 and 404, the at least two frequency sensitive devices 616 and 617 and the at least two current control diodes 618 and 619 detect if an input AC voltage is from the ballast or the AC mains, and allow or limit a current flow into the switch control module 710.

Referring to FIGS. 3 and 4, if the input AC voltage is from line voltages of the AC mains, the at least two frequency sensitive devices 616 and 617 and the at least two current control diodes 618 and 619 detect the input AC voltage at a low frequency of 50~60 Hz and substantially reduce the current to flow into the switch control module 710. Whereas the current is small enough, the capacitor 712, further discharged by the resistor 711, is never charged to a voltage level set by the Zener voltage of the Zener diode 713, thus disabling the switch control module 710 and in turn completely switching off the return current control switch 620. On the other hand, a normal DC voltage appears between the input/output ports 503 and 504, thus enabling the LED driving circuit 100 to operate normally. Consequently, the electric current flows into the one or more LED arrays 214, the inductor 203, the first switch 201 in the LED driving circuit 100, the current sensing resistor 107, back to the input/output port 504, completing the power transfer to the one or more LED arrays 214.

When an input AC voltage from the ballast is detected, the at least two frequency sensitive devices 616 and 617 and the at least two current control diodes 618 and 619 promote a current to flow into the switch control module 710. The current flowing into the switch control module 710 rapidly charges the capacitor 712 in the switch control module 710 to a voltage level set by the Zener voltage of the Zener diode 713. The frequency sensitive device 617 and the current control diode 619 continue to allow the current to flow in and pump the capacitor 712, maintaining the Zener voltage. As long as the Zener voltage is maintained, the switch control module 710 is enabled to turn on the return current control switch 620. Thus, an input current from the port 503, passing through the input filter 102 and the output module and the one or more LED arrays 214 can flow out via the return current control switch 620 back to the input/output port 504, thus completing the power transfer to the one or more LED arrays 214. Because supply current from the ballast is limited, the inrush current flowing into the switch control module 710 crashes the input DC voltage between the input/output ports 503 and 504 to a substantially low level, which is not sufficiently high enough to operate the LED driving circuit 100, thus disabling the LED driving circuit 100.

Figure 5:
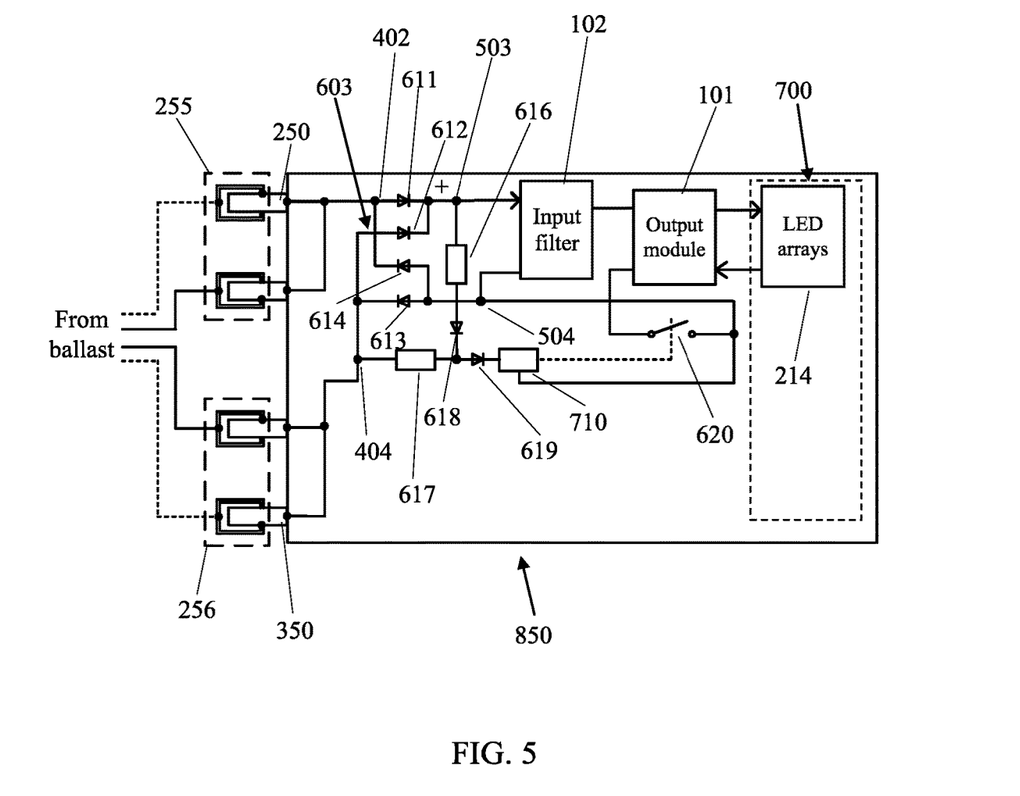
FIG. 5 is a block diagram of an LED lamp operable with a ballast according to the present disclosure.
Figure 6:
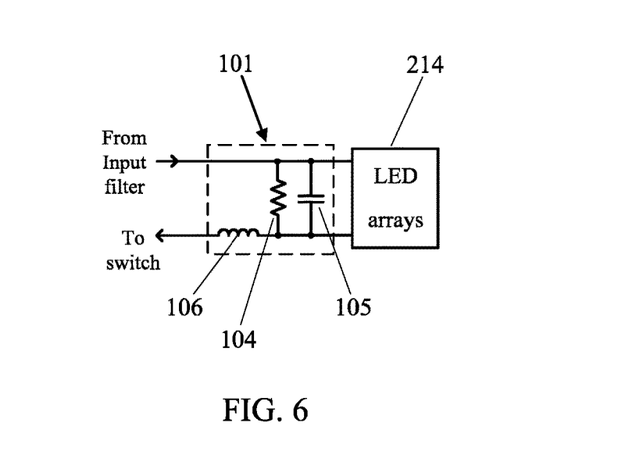
FIG. 6 is an embodiment of an output module used in an LED lamp operable with a ballast according to the present disclosure.

FIG. 5 is a block diagram of an LED lamp 850 operable with a ballast according to the present disclosure. FIG. 5 is similar to FIG. 1, except that an input filter 102 and an output module 101 replace the LED driving circuit 100 in FIG. 1. In FIG. 5, the same numerals are used for the same components as in FIG. 1. FIG. 6 is an embodiment of an output module used in an LED lamp operable with a ballast according to the present disclosure. Referring to FIGS. 5 and 6, when an input AC voltage from the ballast is detected, the at least two frequency sensitive devices 616 and 617 and the at least two current control diodes 618 and 619 promote a current to flow into the switch control module 710. As depicted in FIG. 4, the switch control module 710 comprises a resistor 711, a capacitor 712, and a Zener diode 713 connected in parallel. The current flowing into the switch control module 710 charges the capacitor 712 to a voltage level set by a Zener voltage of the Zener diode 713. As long as the Zener voltage is maintained on the capacitor 712, the switch control module 710 is enabled to turn on the return current control switch 620. Thus, an input current from the port 503, passing through the input filter 102 and the output module 101 and the one or more LED arrays 214 can flow out via the return current control switch 620 back to an applicable electrical connection terminal, thus completing the power transfer to the one or more LED arrays 214. In FIG. 6, the output module 101 connected to the one or more LED arrays 214 may comprise a resistor 104 and a capacitor 105 connected in parallel, configured to build up an output voltage supplied to one or more LED arrays 214. The output module may further comprise an inductor 106 connected in series with the resistor 104 and the capacitor 105, configured to smooth out a current increase.

The LED lamp 850 depicted in FIG. 5 may fit in various sockets and thus may have various base types and shapes. In FIG. 5, although the LED lamp 850 is shown to have the two electrical connection terminals 255 and 256 each with respective bi-pins 250 and 350, the LED lamp 850 may have only one pin on each of the two electrical connection terminals 255 and 256. The dotted line connected between the ballast and the two electrical connection terminals 255 and 256 denotes such a possibility. Nevertheless, the LED lamp 850 may come in a wide variety of shapes and rest on various electrical connection terminals with base types fixed with two or four pins used in compact fluorescent lamps (CFLs) and compact fluorescent bulbs, or other E-base types used in other fluorescent lamps. Base types for two pin plug-in CFLs comprise G23, GX23, and G24D. For 4 pin plug-in CFLs, base types comprise G24Q, GX24Q, and 2G11. Base types for compact fluorescent bulbs comprise two-pin GU24, GU10 and GU5.3. The E-base types, although not of a pin-type, comprise E26, E27, or E39. As mentioned above, because the two pins of the respective bi-pins 250 and 350 in the LED lamp 850 are interconnected before connecting to the rectifier 603 via the input/output ports 402 and 404, either two-pin or four-pin operation works with the LED lamp 850.

Figure 7:
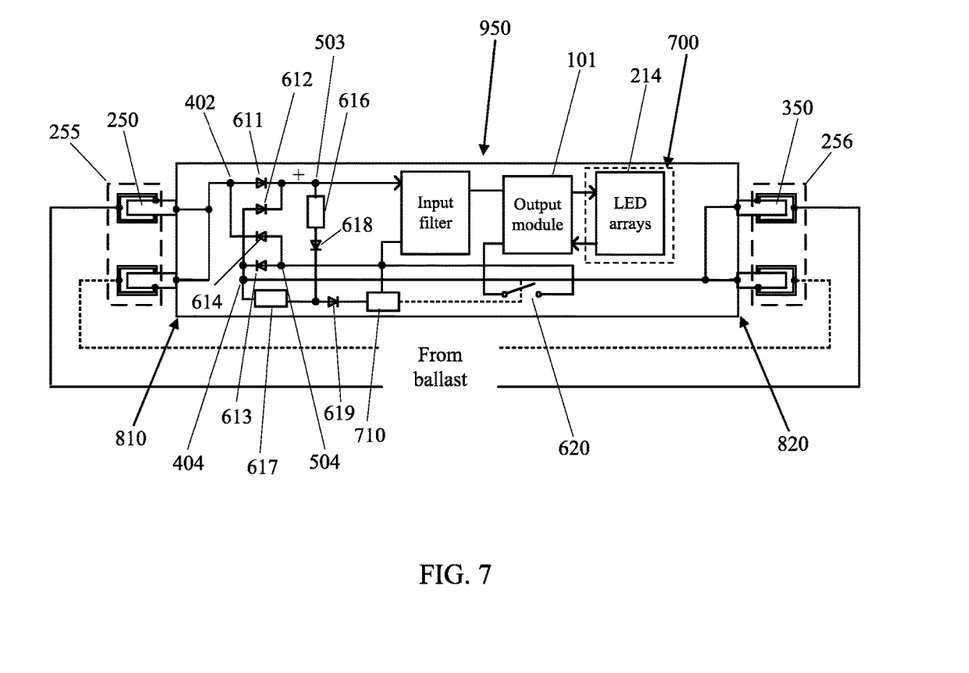
FIG. 7 is a block diagram of a linear LED tube lamp operable with a ballast according to the present disclosure.

FIG. 7 is a block diagram of a linear LED tube lamp 950 operable with a ballast according to the present disclosure. FIG. 7 is similar to FIG. 5, except that the linear LED tube lamp 950 in FIG. 5 comprises two bi-pins 250 and 350 protruding outwards from the two ends of the linear LED tube lamp 950 with two electrical connection terminals 255 and 256. When an input AC voltage from the ballast is detected, the at least two frequency sensitive devices 616 and 617 and the at least two current control diodes 618 and 619 promote a current to flow into the switch control module 710. The current flowing into the switch control module 710 charges the capacitor 712 in the switch control module 710 to a voltage level set by the Zener voltage of the Zener diode 713. As long as the Zener voltage is maintained, the switch control module 710 is enabled to turn on the return current control switch 620. Thus, an input current from the port 503, passing through the input filter 102 and the output module and the one or more LED arrays 214 can flow out via the return current control switch 620 back to an applicable electrical connection terminal, thus completing the power transfer to the one or more LED arrays 214. Not like a conventional ballast compatible only linear LED tube lamp, which can easily be burned out when an AC voltage from the AC mains is accidentally applied to the bi-pins 250 and 350, the linear LED tube lamp 950 according to the present disclosure has an advantage, of which no fire hazard is possible due to said misapplication. This is because the return current control switch 620 can only be turned on by the switch control module 710, which can only be enabled by AC voltage at a high frequency such as 40~65 kHz from the ballast.

The linear LED tube lamp 950 depicted in FIG. 7 may fit in different sockets such as ones used in T5, T8, or T12 fluorescent tubes. In FIG. 5, although the linear LED tube lamp 950 is shown to have the two electrical connection terminals 255 and 256 each with the respective bi-pins 250 and 350 to receive power from AC sources, the linear LED tube lamp 950 may receive power from only one of two pins of each of bi-pins 250 and 350. The dotted line connected between the ballast and the two electrical connection terminals 255 and 256 in FIG. 5 denotes such a possibility. Nevertheless, the linear LED tube lamp 950 may come in different lamp bases such as G13 and G5. As mentioned above, because the two pins of the respective bi-pins 250 and 350 in the linear LED tube lamp 950 are interconnected before connecting to the at least one rectifier 603 via the input/output ports 402 and 404, either two-pin or four-pin operation works with the linear LED tube lamp 950.

In FIGS. 1-3, 5, and 7, the return current switch 620 may comprise electrical terminals of at least one relay. The at least one relay may comprise a solid-state relay, an electronic relay, or an electro-mechanical relay. The return current switch 620 may comprise electrical terminals of at least one triac. The return current switch 620 may comprise electrical terminals of at least one electronic switch. The at least one electronic switch may comprise a metal-oxide-semiconductor field-effect transistor (MOSFET), a field-effect transistor (FET), a transistor, a back-to-back thyristor, a silicon-controlled rectifier (SCR), or a combination thereof.

Whereas preferred embodiments of the present disclosure have been shown and described, it will be realized that alterations, modifications, and improvements may be made thereto without departing from the scope of the following claims. Another LED driving circuit with another frequency sensitive devices or another electric current flow management in an LED lamp using various kinds of combinations to accomplish the same or different objectives could be easily adapted for use from the present disclosure. Accordingly, the foregoing descriptions and attached drawings are by way of example only, and are not intended to be limiting.

What is claimed is:

1. A light-emitting diode (LED) lamp, comprising:
one or more LED arrays;
a light emission portion comprising the one or more LED arrays;
at least one lamp base portion connected to the light emission portion, the at least one lamp base portion comprising electrical connection terminals;
at least six diodes comprising at least four rectifier diodes and at least two current control diodes configured to convert an alternating current (AC) input voltage into a direct current (DC) input voltage and manage current flows;
an LED driving circuit configured to receive the DC input voltage from the at least four rectifier diodes, the LED driving circuit comprising a power factor correction (PFC) and control device, a first switch controlled by the PFC and control device, a current sensing resistor, a diode, an inductor with its current charging and discharging controlled by the first switch, a resistor, and an output capacitor in parallel with the resistor and connected to the inductor to build up an output voltage to power the one or more LED arrays;
a second switch connected to the first switch in the LED driving circuit; and
at least two frequency sensitive devices connected to the at least two current control diodes,
wherein, when AC mains are used to power the LED lamp, the first switch is operated to drive the one or more LED arrays, and
wherein, when a ballast is used to power the LED lamp, the second switch is operated to drive the one or more LED arrays.

2. The LED lamp of claim 1, wherein the inductor in the LED driving circuit is a part of a transformer.

3. The LED lamp of claim 1, further comprising a switch control module that builds up a voltage to switch on the second switch and to maintain the voltage when the ballast is used to power the LED lamp.

4. The LED lamp of claim 3, wherein the switch control module comprises a resistor, a capacitor, and a Zener diode connected in parallel and configured to receive a DC current from the at least two frequency sensitive devices and the at least two current control diodes.

5. The linear LED lamp of claim 1, wherein the second switch comprises electrical terminals of at least one relay.

6. The linear LED lamp of claim 5, wherein the at least one relay comprises a solid-state relay, an electronic relay, or an electro-mechanical relay.

7. The linear LED lamp of claim 1, wherein the second switch comprises electrical terminals of at least one triac.

8. The linear LED lamp of claim 1, wherein the second switch comprises electrical terminals of at least one electronic switch.

9. The linear LED lamp of claim 8, wherein the at least one electronic switch comprises a metal-oxide-semiconductor field-effect transistor (MOSFET), a field-effect transistor (FET), a transistor, a back-to-back thyristor, a silicon-controlled rectifier (SCR), or a combination thereof.

10. The LED lamp of claim 1, wherein the electrical connection terminals comprise four pins comprising a base of G24Q, GX24Q, or 2G11.

11. The LED lamp of claim 1, wherein the electrical connection terminals comprise two pins comprising a base of G23, GX23, or G24D.

12. The LED lamp of claim 1, wherein the electrical connection terminals comprise two pins comprising a base of GU24, GU10, or GU5.3.

13. The LED lamp of claim 1, wherein the electrical connection terminals comprise a base of E26, E27, or E39.

14. The LED lamp of claim 1, wherein the electrical connection terminals comprise two sets of bases of G13 or G5.

* * * * *